United States Patent [19]

Fisch et al.

[11] Patent Number: 5,497,924
[45] Date of Patent: Mar. 12, 1996

[54] ROOF RACK RAIL SUPPORT FOOT FOR AUTOMOTIVE VEHICLES

[75] Inventors: Fritz Fisch, Wuppertal; Ulrith Rehm, Hagen, both of Germany

[73] Assignee: Happich Fahrzeug-Dachsysteme GmbH, Germany

[21] Appl. No.: 266,219

[22] Filed: Jun. 27, 1994

[30] Foreign Application Priority Data

Jun. 29, 1993 [DE] Germany .............. 43 21 537.8

[51] Int. Cl.⁶ ........................................ B60R 9/04
[52] U.S. Cl. ............................... 224/326; 224/309
[58] Field of Search .................... 224/309, 316, 224/325, 326, 327, 329

[56] References Cited

U.S. PATENT DOCUMENTS

| | | | |
|---|---|---|---|
| 4,469,261 | 9/1984 | Stapleton et al. | 224/326 |
| 4,768,691 | 9/1988 | Stapleton | 224/326 |
| 4,834,448 | 5/1989 | Sakamoto et al. | 224/309 |
| 5,004,139 | 4/1991 | Storm et al. | 224/309 |
| 5,203,483 | 4/1993 | Cucheran | 224/326 |

FOREIGN PATENT DOCUMENTS

| | | | |
|---|---|---|---|
| 2018357 | 12/1990 | Canada . | |
| 2648093 | 12/1990 | France . | |
| 3121086 | 12/1982 | Germany | 224/309 |
| 3230346 | 2/1984 | Germany . | |
| 3539449 | 5/1987 | Germany . | |
| 4004829 | 8/1991 | Germany | 224/309 |
| 2221664 | 2/1990 | United Kingdom | 224/329 |

*Primary Examiner*—Henry J. Recla
*Assistant Examiner*—Charles R. Eloshway
*Attorney, Agent, or Firm*—Ostrolenk, Faber, Gerb & Soffen

[57] ABSTRACT

A roof rack rail supported at each end of the rail on the roof of a vehicle by a support foot. The support foot has a fastening bolt at one end for attaching to the roof of the vehicle and an insertion bolt at the other end for connecting with the end of the rail. A sheet metal stamped reinforcing insert is received in slits in the ends of the bolts for connecting the bolts together. The ends of the bolts and the reinforcement insert are molded in plastic to define the roof rail foot. In an alternative design, the rail is in the form of a tubular sleeve and the insertion bolts for the feet are received in the sleeve. The entire assembly of the sleeve and the reinforcements for the feet is then molded over with plastic which forms the feet and covers over the rail end integrating them with the rail.

10 Claims, 3 Drawing Sheets

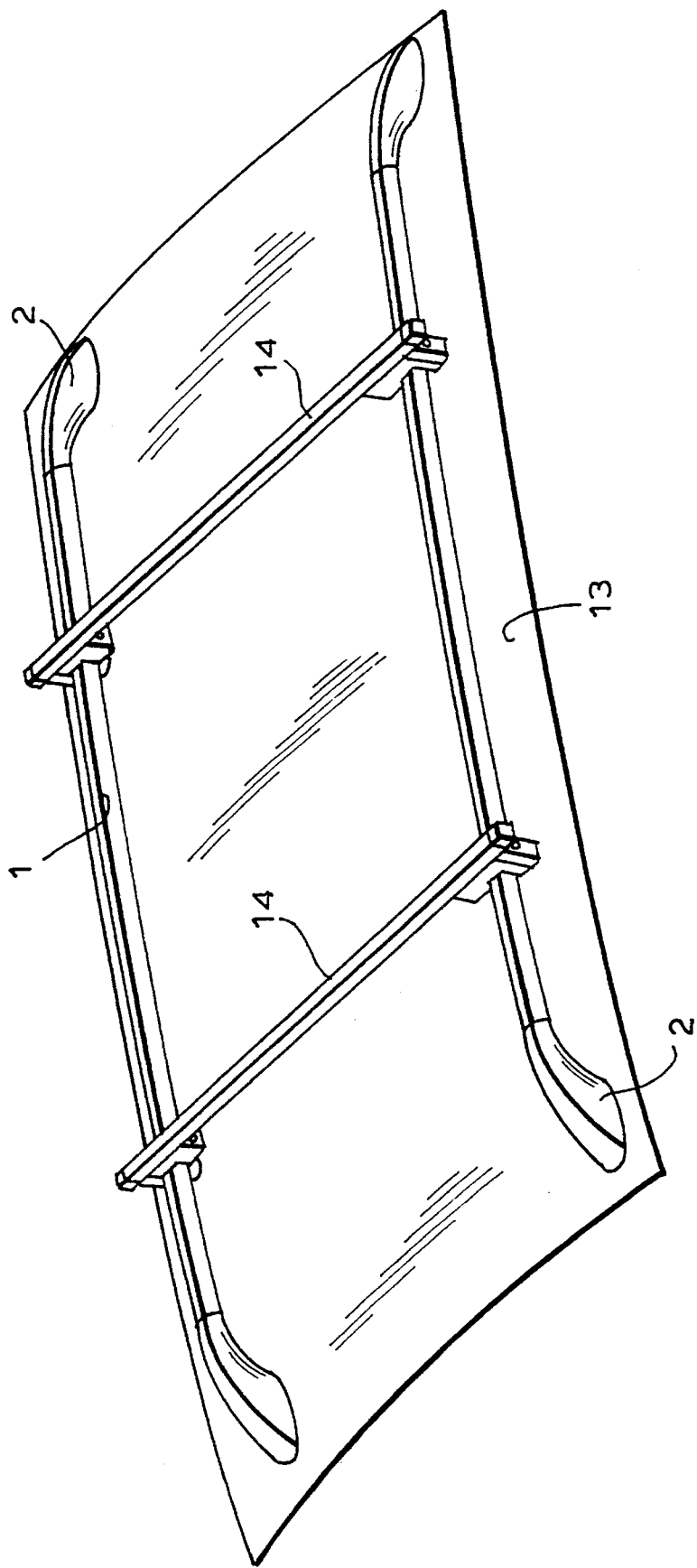

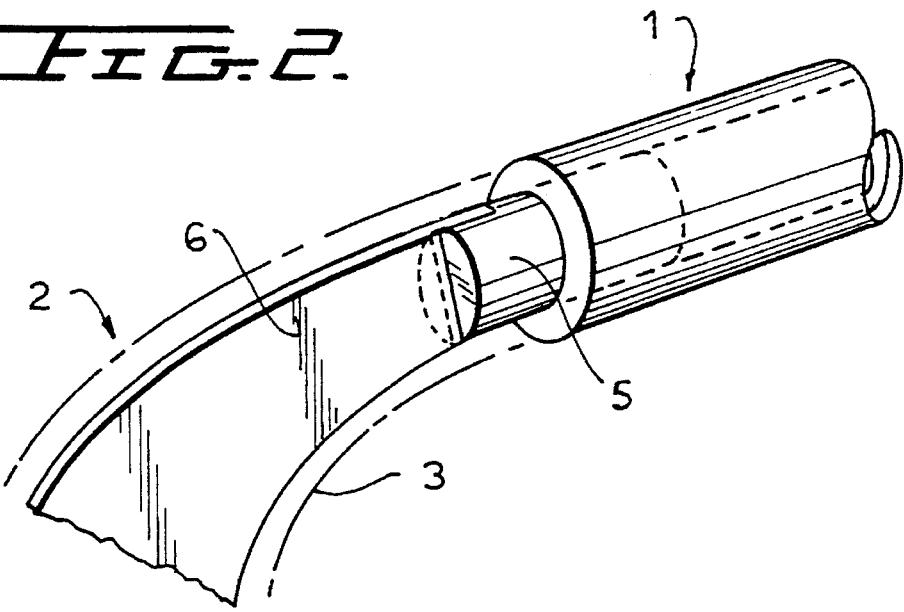
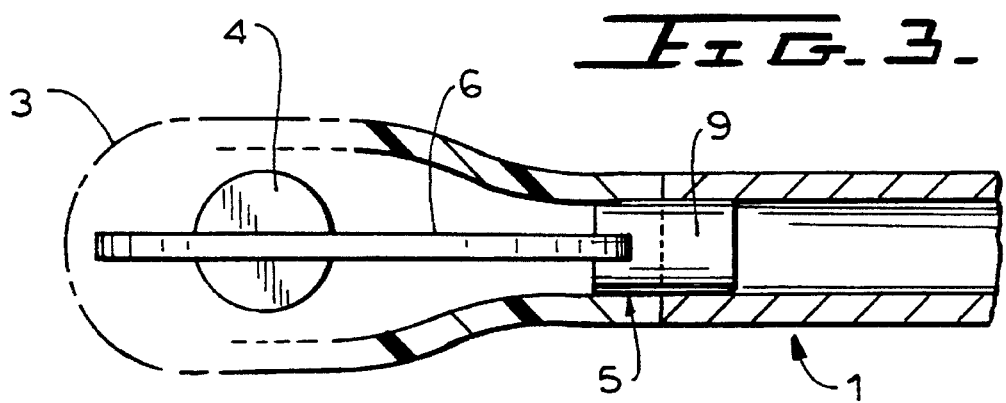
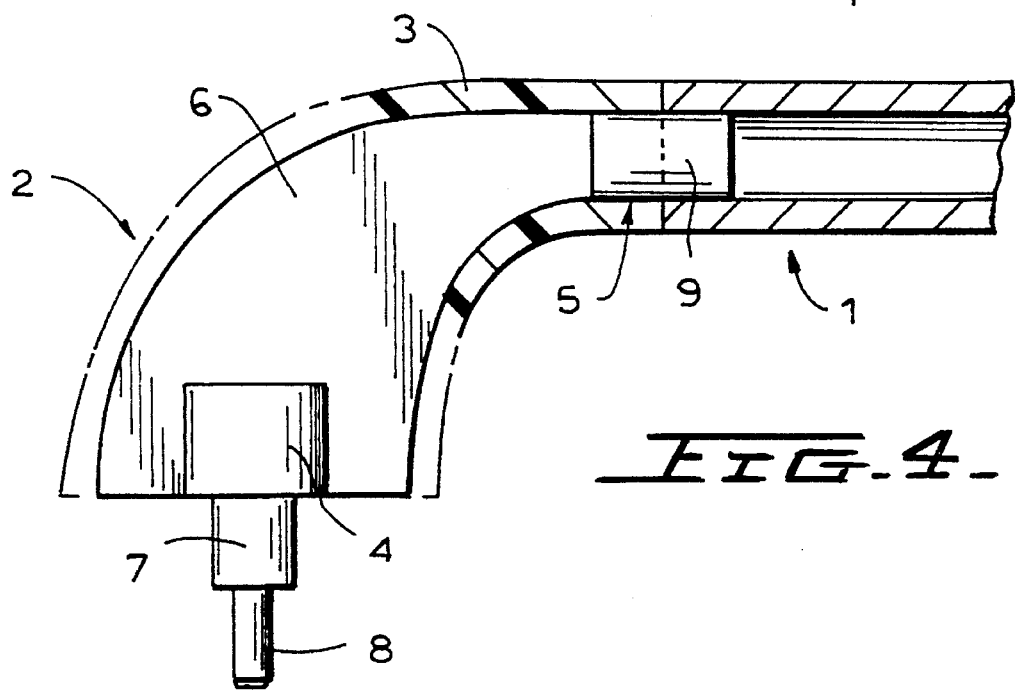

ROOF RACK RAIL SUPPORT FOOT FOR AUTOMOTIVE VEHICLES

BACKGROUND OF THE INVENTION

The present invention refers to a vehicle roof rack having a rail as one of its elements. Each end of the rail is supported by a support foot on the roof of the motor vehicle. Each support foot has a fastening bolt at one end of the foot for attaching it to the roof of the vehicle and has an insertion bolt at the other end of the foot for attaching the foot to the rail.

A roof rack for vehicles is generally comprised of two rails which extend along the side edges of the surface of the roof. The rails are supported, at least at their ends, by support feet which rest on the surface of the roof. Transverse carriers for receiving loads can be arranged on the rails. The traditional roof rack has the disadvantages that the cost of manufacture of the support feet is too great and, furthermore, their weight is too heavy since, as a rule, they are developed as solid metal bodies.

SUMMARY OF THE INVENTION

Starting from the known roof rack, it is the object of the present invention to improve it by simplifying its manufacture and, in particular, reducing its weight while, at the same time, maintaining its comparatively high strength.

According to the invention, each support foot is developed as a plastic injection molding. Within spaced apart regions of the molding, two bolts comprised of metal and a reinforcing element for connecting the bolts to each other are arranged.

The invention considerably reduces the weight of the support feet without reducing their strength which would make the suitability of the feet questionable. Attachment of the rails to the roof is assured by means of metal bolts, preferably of steel. The strength of the support feet themselves is assured by the incorporated reinforcing element which connects the bolts to each other. The known gas inner pressure method can also be used for manufacturing the support feet. At least one hollow space is developed within the support feet for further weight reduction by this method.

A sheet metal stamping can advantageously be used as the reinforcing element, since such a stamped out part is fully capable of satisfying the strength requirements and it can be obtained at a particularly low cost. Because the reinforcing element is enclosed within the material of the support foot, there are no corrosion problems.

As a further feature, the reinforcing element is rigidly attached to the bolts at the ends of each foot. This improves the strength of the foot and permits combining the bolts and the reinforcing element into a single insert part which is easy to handle and to cover and enclose through a molding step. For that rigid attachment, the reinforcing element can be bonded, welded, soldered or rivetted to the bolts.

The regions of the fastening bolt and the insertion bolt which are incorporated in the support feet preferably have slit openings to receive the inserted of reinforcing element. The parts can thus be easily assembled by hand, for instance, they can be inserted into a welding device and then can be rigidly attached to each other. As a result, this further assures that the reinforcing element is always in the center of the foot and is aligned with the longitudinal center axis of the support foot.

The invention can be further particularly advantageously developed with the support foot on one end of the rail developed in one piece with the support foot on the other end of the rail. For this purpose, the rail is in the form of a tubular sleeve and the bolts at the rail facing ends of the feet are installed in the sleeve. Then the entire rail with feet unit is formed of one plastic part in a mold with the sleeve and the reinforcements molded into the one plastic part and the feet formed around the reinforcements and the bolts through the molded on plastic. The tubular sleeve is thus held together by the bolts present in the sleeve. This embodiment has the particular advantage that the roof rack rail can be formed of a one piece eternal casting which has no parting line, appendages, or the like.

Other objects and features of the invention are explained in further detail with reference to the drawings.

BRIEF DESCRIPTION OF THE DRAWINGS

FIG. 1 illustrates a roof rack of the invention on a vehicle roof;

FIG. 2 is a perspective and cross-sectional view of one of the two end regions of a first embodiment of a roof rack rail;

FIG. 3 is a top cross-sectional view of the end region;

FIG. 4 is a side cross-sectional view of the end region; and

DESCRIPTION OF THE PREFERRED EMBODIMENTS

Figure 5:
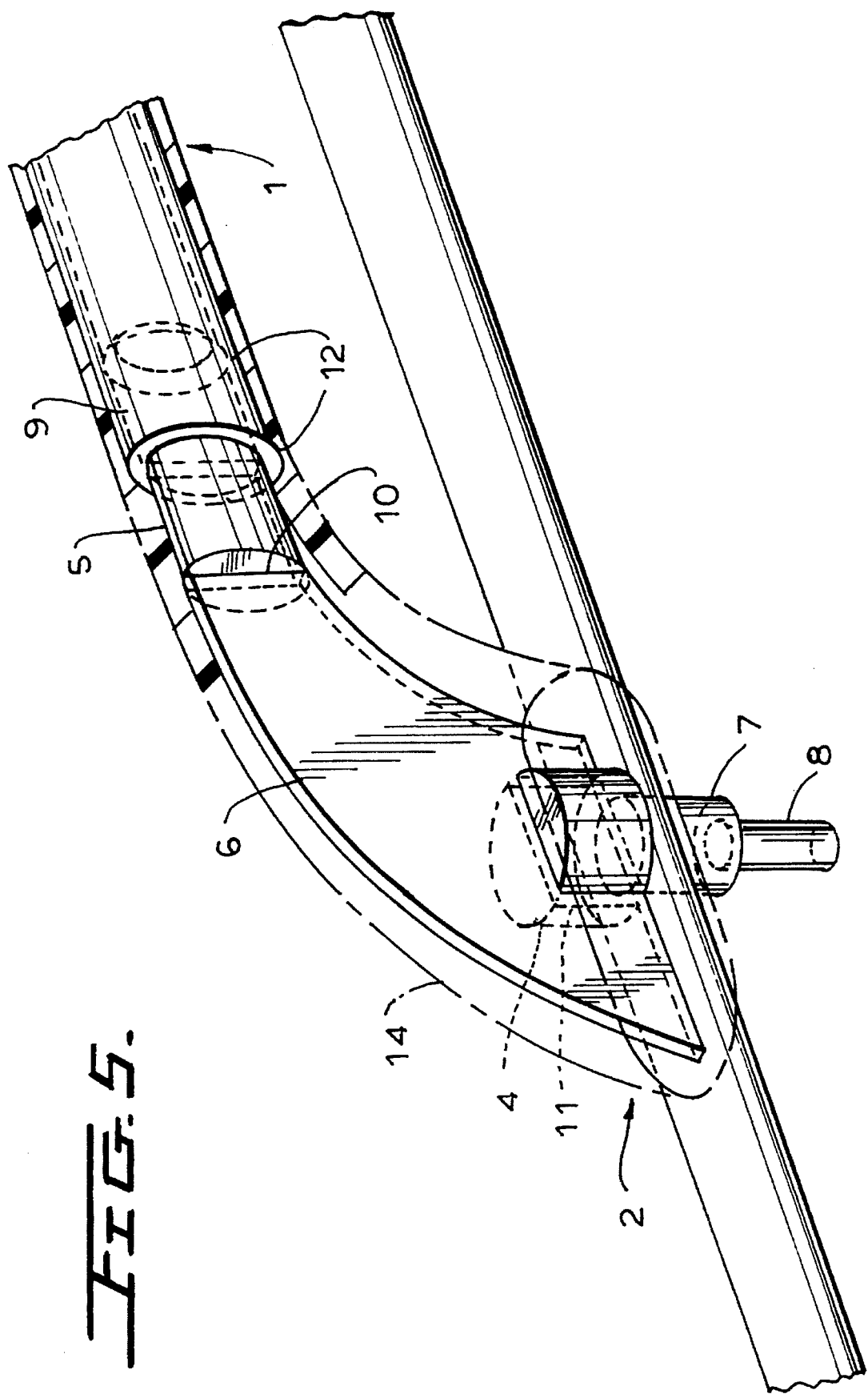
FIG. 5 is a perspective and cross-sectional view of a second embodiment of the end region of a roof rack rail.

A roof rack for a vehicle includes two parallel rails 1 extending longitudinally and parallel to each other along a vehicle roof 13. The rails are essentially the same in construction. The rails are joined by spaced apart, parallel transverse load supports 14. FIGS. 2–4 show one rail 1 of which only one end region is shown. The end of the rail includes a support foot 2. The other end region (not shown) of the rail 1 is developed in a manner corresponding to the end region shown.

The support foot 2 has a curved body which is comprised of an injection molding 3 of plastic and the foot can contact the roof and the end of the rail 1. A fastening bolt 4 is at the roof engaging end of the foot. An insertion bolt 5 is at the other rail engaging end of the foot. A plate like, curved reinforcing element 6 rigidly connects the bolts 4 and 5 to each other so that they might be incorporated in the foot together. These elements are enclosed by the extrusion or molding 3 of plastic material around all of them to define the one foot 2.

The fastening bolt 4 is supported at one end of the bolt by a thickened head region in the support foot 2. The end of the bolt 4 extends out of the resting surface of the support foot 2 at a shank 7. Adjoining the shank 7 as an axial extension thereof, there is a threaded shank 8. Shank 7 and threaded shank 8 serve for fastening the foot 2 and thus the roof rack to the roof of a vehicle. The fastening means are known in detail so that they are not further explained here.

Like the fastening bolt 4, the insertion bolt 5 is incorporated in the respective rail engaging end region along the molding 3 of the support foot 2. The bolt 5 extends beyond the end of the foot 2 to define its axial end region 9 which enables a plug connection of that end region into the rail 1.

Each of the bolts 4 and 5 is slit across its respective axial end region contained within the molding 3. Those slit openings 10, 11 receive the ends of the reinforcing element 6 inserted into them. The corresponding end regions of the plate thin element 6 engage into the slit openings 10, 11. The reinforcing element 6 preferably is comprised of a sheet metal blank having an edge contour which is adapted on a reduced scale to the shape of the molding 3. Rigid bonded connections between the bolts 4 and 5 and the reinforcing element 6 can be produced in a simple manner by, for instance, welding, soldering or riveting.

It is possible to produce each support foot 2 with the part incorporated in it as a separate structural parts and to then connect each foot by insertion into the rail 1. Once the feet have been assembled to the rail, the resulting rail will appear to be of three components, the rail and its two end feet. Dirt may accumulate in the seams between the components so that the embodiment of FIG. 5 is proposed.

Another interesting possibility shown is to develop the support foot 2 at one end of the rail 1 so that it is molded together with and all in a single piece with the support foot 2 at the other end of the rail and with the rail itself. As in the first embodiment, there is a reinforcement 6 and bolts 4 and 5 at each end of the rail 1. But instead of the rail 1 and both feet 2 being formed separately and then assembled, the rail 1 is initially formed with the reinforcements 6, each reinforcement with its respective bolts 4 and 5 in place. The rail comprises a tubular reinforcing sleeve 12 comprised, for instance, of aluminum, which is of a length sufficient to extend to both bolts 5 and which is mounted with its ends extending over the axial extensions 9 of both bolts 5. Then the entire structural unit consisting of two reinforcing inserts with bolts and the tubular sleeve 12 is inserted into the cavity of an injection molding machine and is there surrounded completely with a continuous sleeve covering of plastic material. The molding process for the first time forms the complete support feet 2 around the reinforcement 6 and the bolts 4 and 5, and the molded plastic also extends from the first support foot 2 over the rail 1 to the second support foot without a seam. A center support for the rail is possibly also formed integrally on the rail.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roof rack rail for a vehicle roof or like use comprising:

a rail portion to be supported above the roof, the rail portion having a first end;

a support foot at a first end of the rail portion for supporting the rail above the roof;

the support foot including a body molded of plastic material and having a first end to be placed at the vehicle roof; a fastening bolt at the first end of the body including a first portion inside the body and another portion extending from the body for attachment to the roof;

the body having a second end located proximate the first end of the rail portion; an insertion bolt at the second end of the body also including a first portion inside the body and another portion extending from the body for attachment of the foot to the first end of the rail portion;

a reinforcing element disposed in the body and extending within the body between the first portions of the fastening bolt and the insertion bolt inside the body for connecting the first portions together;

the body enclosing the first portions of the fastening bolt and the insertion bolt in the body and also enclosing the reinforcing element;

said first portions of the respective fastening bolt and the insertion bolt having respective axially directed slit openings therein, and the reinforcing element being entered into the respective slit openings.

2. The roof rack rail of claim 1, wherein the body is curved, so that the first end of the body faces down to the vehicle and the second end of the body faces toward the first end of the rail portion.

3. The roof rack rail of claim 1, wherein the reinforcing element comprises a sheet metal piece which extends to and is in engagement with the fastening bolt and the insertion bolt.

4. The roof rack rail of claim 3, wherein the reinforcing element is rigidly attached to the bolts, and the plastic material of the body holds the bolts with the reinforcing element at the bolts.

5. The roof rack rail of claim 1, wherein the reinforcing element is rigidly attached to the bolts and the plastic material of the body holds the bolts with the reinforcing element at the bolts.

6. The roof rack rail of claim 1, wherein the reinforcing element is securely attached to the bolts by an operation from the group of operations consisting of bonding, welding, soldering and riveting.

7. A roof rack rail for a vehicle roof or like use comprising:

a rail portion to be supported above the roof, the rail portion having a first end;

a support foot at a first end of the rail portion for supporting the rail above the roof;

the support foot including a body molded of plastic material and having a first end to be placed at the vehicle roof; a fastening bolt at the first end of the body including a first portion inside the body and another portion extending from the body for attachment to the roof;

the body having a second end located proximate the end of the rail portion; an insertion bolt at the second end of the body also including a first portion inside the body and another portion extending from the body for attachment of the foot to the first end of the rail portion;

a reinforcing element disposed in the body and extending within the body between the first portions of the fastening bolt and the insertion bolt inside the body for connecting the first portions together;

the body enclosing the first portions of the fastening bolt and the insertion bolt in the body and also enclosing the reinforcing element;

said rail portion having a second end portion opposite said first end portion and another support foot at said second end of the rail;

said another support foot including another body molded of plastic material and having a first end to be placed at the vehicle roof and another fastening bolt having a first portion inside of said another body and another portion extending from a first end of the another body for attachment to the roof, another insertion bolt including a first portion inside of said another body and another portion extending from a second end of the another body for attachment of the another support foot to the second end portion of the rail portion, and another reinforcing element disposed in said another body and extending within the another body between the first portions of the another insertion bolt and the another fastening bolt;

said rail portion comprising a tubular sleeve including the respective first and second end portions of the rail portion, the another portions of the respective insertion bolt and the another insertion bolt extending into the tubular sleeve and being secured thereto;

said tubular sleeve having a covering constructed of plastic material;

said covering, said body and said another body being formed as a seamless unitary structure;

said first portions of the fastening bolt and the insertion bolt within the body have respective axially directed slit openings therein, and the reinforcing element is inserted into the respective slit openings; and, said first portions of the another fastening bolt and the another insertion bolt within the another body have respective another axially directed slit openings therein, and the another reinforcing element is inserted into the respective another slit openings.

8. The roof rack rail of claim 7, wherein each of the body and the another body is curved, so that the first ends of the body and the another body face down to the vehicle, the second end of the body faces toward the first end of the rail portion and the second end of the another body faces toward the second end of the rail portion.

9. The roof rack rail of claim 8, wherein the reinforcing element comprises a sheet metal piece which extends to and is in engagement with the fastening bolt extending from the body and the insertion bolt extending from the body; and the another reinforcing element comprises another sheet metal piece which extends to and is in engagement with the another fastening bolt extending from the another body and the another insert bolt extending from the another body.

10. The roof rack rail of claim 8, wherein the reinforcing element is rigidly attached to the bolts that extend from the body, and the plastic material of the body holds the bolts that extend from the body, with the reinforcing element being at the bolts that extend from the body; and the another reinforcing element being rigidly attached to the bolts that extend from the another body, and the plastic material of the another body holds the another bolts that extend from the another body, with the another reinforcing element being at the another bolts that extend from the another body.

\* \* \* \* \*